United States Patent
Huang et al.

(10) Patent No.: US 11,044,605 B2
(45) Date of Patent: Jun. 22, 2021

(54) NETWORK BASED NON-IP DATA DELIVERY SERVICE AUTHORIZATION FOR WIRELESS NETWORKS

(71) Applicant: Verizon Patent and Licensing Inc., Arlington, VA (US)

(72) Inventors: Ye Huang, San Ramon, CA (US); Arvind Aggarwal, San Ramon, CA (US); Miguel A. Carames, Long Valley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 55 days.

(21) Appl. No.: 16/409,310

(22) Filed: May 10, 2019

(65) Prior Publication Data

US 2020/0359213 A1    Nov. 12, 2020

(51) Int. Cl.
| | |
|---|---|
| *H04L 12/26* | (2006.01) |
| *H04W 12/06* | (2021.01) |
| *H04W 8/18* | (2009.01) |
| *H04W 60/00* | (2009.01) |
| *H04W 8/08* | (2009.01) |
| *H04W 8/26* | (2009.01) |
| *H04W 76/11* | (2018.01) |
| *H04L 29/12* | (2006.01) |
| *H04W 8/20* | (2009.01) |

(52) U.S. Cl.
CPC ......... *H04W 12/06* (2013.01); *H04L 61/3075* (2013.01); *H04W 8/08* (2013.01); *H04W 8/183* (2013.01); *H04W 8/20* (2013.01); *H04W 8/26* (2013.01); *H04W 60/00* (2013.01); *H04W 76/11* (2018.02)

(58) Field of Classification Search
None
See application file for complete search history.

(56) References Cited

U.S. PATENT DOCUMENTS

| | | | |
|---|---|---|---|
| 2018/0219981 A1* | 8/2018 | Backman | H04L 65/102 |
| 2018/0249282 A1* | 8/2018 | McCann | H04L 65/1063 |
| 2019/0028337 A1* | 1/2019 | Ryu | H04W 4/70 |
| 2019/0028866 A1* | 1/2019 | Baek | H04W 4/70 |
| 2019/0090298 A1* | 3/2019 | Abraham | H04W 4/70 |
| 2019/0166016 A1* | 5/2019 | Livanos | H04L 67/26 |
| 2019/0230492 A1* | 7/2019 | Suzuki | H04W 88/18 |
| 2019/0253875 A1* | 8/2019 | Vittal | H04L 61/3075 |
| 2019/0306753 A1* | 10/2019 | Uchida | H04W 28/04 |

(Continued)

*Primary Examiner* — Kwang B Yao
*Assistant Examiner* — Juvena W Loo

(57) ABSTRACT

A method for authorizing a non-IP data delivery service may include receiving a request from a user equipment device (UE) to attach to an access network based on a generic non-internet protocol (IP) access point name (APN), and performing an initial service authorization of the UE for a non-IP data delivery (NIDD) service with the generic non-IP APN. The method may further include generating a specific non-IP APN by combining the generic non-IP APN with an APN originating identifying anchor (OIA), where the APN OIA identifies an organization associated with the NIDD service. The method may include performing a secondary service authorization of the UE within the access network using the APN OIA, and notifying an application server (AS) of the UE availability for the NIDD service using the generic non-IP APN.

20 Claims, 8 Drawing Sheets

(56) References Cited

U.S. PATENT DOCUMENTS

| | | | | |
|---|---|---|---|---|
| 2019/0364064 A1* | 11/2019 | Gupta | ................... | H04L 67/125 |
| 2019/0379664 A1* | 12/2019 | Suthar | ..................... | H04W 4/70 |
| 2019/0394712 A1* | 12/2019 | Ronneke | ............ | H04L 43/0811 |
| 2020/0014762 A1* | 1/2020 | Li | ........................ | H04W 60/04 |
| 2020/0021953 A1* | 1/2020 | Mahalank | ............... | H04W 4/14 |
| 2020/0028973 A1* | 1/2020 | Livanos | ................ | H04M 15/43 |
| 2020/0053802 A1* | 2/2020 | Li | ........................ | H04W 68/005 |
| 2020/0097277 A1* | 3/2020 | Gupta | ................... | H04L 41/082 |
| 2020/0120475 A1* | 4/2020 | Gupta | ..................... | H04W 8/06 |
| 2020/0137621 A1* | 4/2020 | Yang | ..................... | H04W 48/16 |
| 2020/0146077 A1* | 5/2020 | Li | ........................ | H04W 76/10 |

* cited by examiner

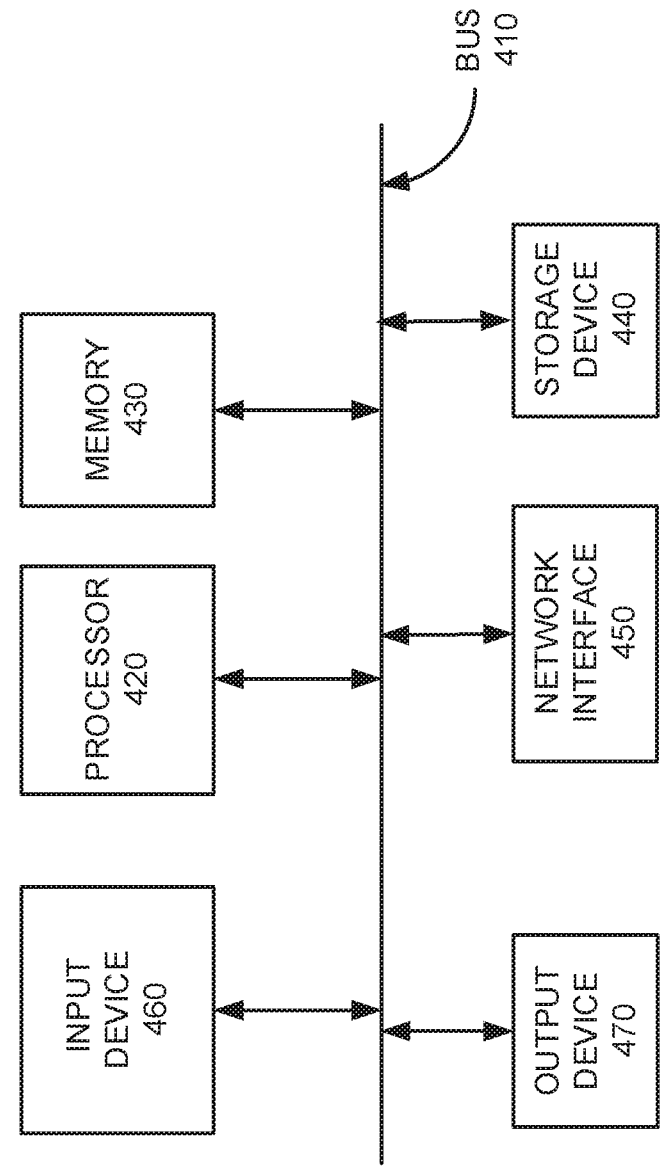

NETWORK BASED NON-IP DATA DELIVERY SERVICE AUTHORIZATION FOR WIRELESS NETWORKS

BACKGROUND

Long Term Evolution (LTE) is an existing mobile telecommunications standard for wireless communications. Next Generation wireless networks, such as fifth generation (5G) networks, will provide increased capacity and speed. Both LTE and 5G networks will have the flexibility to provide non-internet protocol data delivery (NIDD) services having improved communication efficiencies. However, conventional authorization techniques for NIDD services can present operational challenges and security vulnerabilities.

BRIEF DESCRIPTION OF THE DRAWINGS

FIG. 4 is a block diagram showing exemplary components of a network device according to an embodiment;

DETAILED DESCRIPTION OF THE PREFERRED EMBODIMENTS

Figure 1:
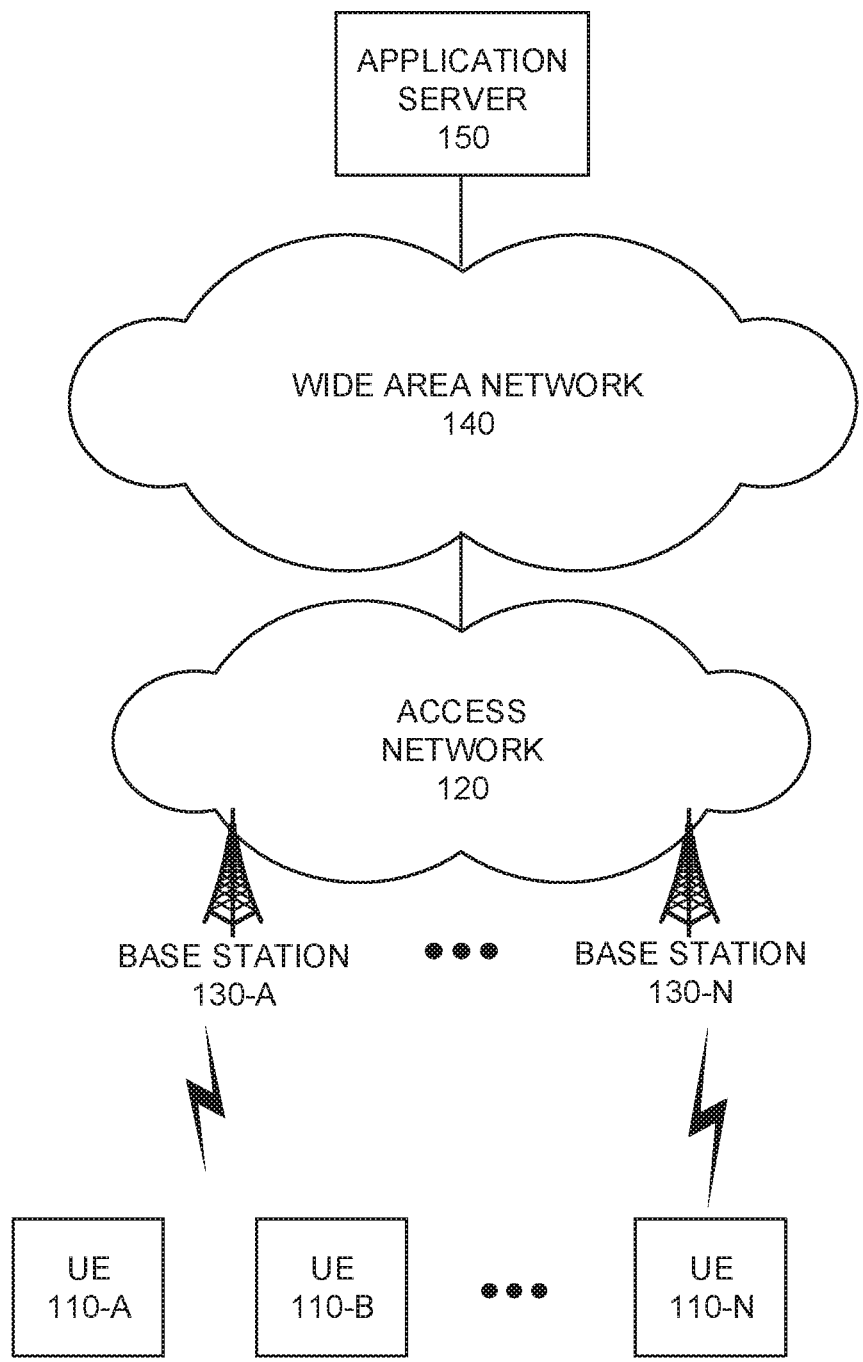
FIG. 1 is a diagram illustrating an exemplary network environment consistent with an embodiment.

The following detailed description refers to the accompanying drawings. The same reference numbers in different drawings may identify the same or similar elements. The following detailed description does not limit the invention.

Embodiments described herein are directed to wireless communications systems which perform network-based authorization for non-internet protocol (IP) data delivery (NIDD) services. NIDD services provide efficient communication channels for exchanging data between small/mobile devices and application servers. Such devices may include any mobile communication devices and/or Internet of things (IoT) devices, and are generally referred to as user equipment devices (UEs) herein. NIDD protocols may exchange data over a control plane delivery path, and thus can avoid having to set up a full packet data network (PDN) bearer which may be used in conventional IP-based data exchanges. NIDD protocols may also provide header compression and operation optimization to allow effective transmission of transactional data with small frame sizes. Such protocols may be useful in IoT applications (e.g., sensors, machines to machines, etc.) where UEs may communicate small quantities of data (e.g., periodically triggered measurements from sensors) with application servers.

To facilitate NIDD exchanges between UEs and application servers, a network device providing an exposure function may facilitate communications by securely exposing the capabilities and status of UEs to application servers providing NIDD services. In a long-term evolution (LTE) network, the exposure function may be performed by a service capability exposure function (SCEF) or device. In a fifth generation (5G) network, the exposure function may be performed by a network exposure function (NEF) or device. For example, the SCEF/NEF may provide an external application server visibility into the reachability of UEs, and determine when each UE registered with the SCEF/NEF is available or unavailable. To maintain security, NIDD services require authorization prior to exchanging non-IP data.

Conventional approaches for authorization have various drawbacks for UEs. For example, UEs may be provisioned with organization specific non-IP access point names (APNs) via some form of device management system (e.g., an open mobile alliance management device such as a lightweight machine-to-machine manager) in order to authorize with the access network and setup non-IP connections with the SCEF/NEF. Conventional systems have to provision UEs with specific non-IP APNs, which may prevent some factory tests and/or trials when no device management system is available. Additionally, this conventional provisioning requirement for UEs can present complexity when roaming, during factory testing, and/or during time-limited trials and cross-promotions provided through multiple business relationships.

For some non-IP devices (such as narrow-band IoT devices), device management systems for non-IP networks are being developed. Upon introduction of new device management systems, a potential exists for inconsistent and/or out of sync APN provisioning which may cause service issues.

Further, some conventional approaches for NIDD service authorization also present challenges for application servers. An NIDD service may require an application server to perform registration and/or authorization for each UE before the application server is able to set up the NIDD with the SCEF/NEF. Such a requirement places a burden on application servers to coordinate the UE activations for the NIDD service, which may complicate the logistics of activation on the user side and/or on the network carrier side.

Finally, conventional approaches for NIDD service authorization may present potential fraud, spamming, and/or security vulnerabilities because application servers, which typically are controlled by third party organizations and not the network carrier, perform authorizations using credentials which identify the organizer associated with NIDD service. Such information may be used for pretexting when a malicious actor, who assumes the identity of the organizer, fraudulently offers the NIDD service.

Embodiments presented herein may address the aforementioned issues by performing a two-step authorization process which utilizes two different non-IP APNs. The first type of APN is referred to as a "generic non-IP APN" which may be associated with a carrier network. The second type of APN is referred to as a "specific non-IP APN" that includes a new attribute value pair (AVP) value called an "APN Originating Identifying Anchor" (OIA). The APN OIA may include specific identifying information regarding the organization (e.g., a company, an enterprise entity, a non-profit, etc.) which may be associated with (e.g., sponsors, provides, creates, etc.) the NIDD service. Using the generic non-IP APN, all of the UEs may be provisioned at the factory, or by the network carriers, with a common non-IP APN to perform a first authorization with the network. The generic non-IP APN does not include any specific identifying information, so it may be widely distributed outside the network without introducing security vulnerabilities.

Using the generic non-IP APN, a particular UE may perform a first authorization with the network. Once the first authorization is performed, the network may then perform a second authorization using the specific non-IP APN. The specific non-IP APN, which includes organization identification in the OIA, may stay within the confines of the access network, and thus is not provided to UEs and/or application servers to maintain security. Accordingly, embodiments improve the efficiency and convenience of authorization because UEs no longer need to be provisioned with the specific organization identification associated with the NIDD service prior to authorization. Thus, networks no longer require a device management system to provision UEs with organization specific non-IP APNs prior to authorization. Moreover, manufacturers no longer are burdened with provisioning UEs with specific non-IP APNs, which further eases factory testing, trials, and cross promotions, and also simplifies roaming.

Additionally, embodiments ease the burdens of organizations providing NIDD services by simplifying authorization for application servers. For example, application servers no longer need to perform registration and/or authorization with the SCEF/NEF to set up the NIDD service for a particular UE. Thus, application servers no longer need to coordinate with UE activations for NIDD services and/or maintain and track UE registration information. This also simplifies authorization for the carrier network, and further reduces SCEF/NEF context usage.

Finally, the specific non-IP APN are contained within the network and not provided to UEs and/or application servers, thus avoiding the exposure of the true organization identified in the APN OIA which improves security by avoiding fraud, spamming, and other vulnerabilities such as pretexting as noted above. Application servers use only generic non-IP APN to reregister the UE for NIDD services.

FIG. 1 is a diagram illustrating an exemplary network environment 100 consistent with an embodiment. As shown in FIG. 1, environment 100 may include endpoint user equipment devices (UEs) 110-A to 110-N (referred to herein collectively as "UEs 110" and individually as "UE 110"), an access network 120, a wide area network (WAN) 140, and an application server (AS) 150.

UEs 110 may include any device with long-range (e.g., cellular or mobile wireless network) wireless communication functionality. For example, UE 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer, or a digital media player (e.g., Apple TV, Google Chromecast, Amazon Fire TV, etc.); a smart television; a portable gaming system; a global positioning system (GPS) device; a home appliance device; a home monitoring device; and/or any other type of computer device with wireless communication capabilities and a user interface. UE 110 may also include any type of customer premises equipment (CPE) such as a set top box, a wireless hotspot (e.g. an LTE or 5G wireless hotspot), a femto-cell, etc. UE 110 may include capabilities for voice communication, mobile broadband services (e.g., video streaming, real-time gaming, premium Internet access etc.), best effort data traffic, and/or other types of applications.

In some implementations, UEs 110 may communicate using machine-to-machine (M2M) communication, such as machine-type communication (MTC), a type of M2M communication standardized by the 3$^{rd}$ Generation Partnership Project (3GPP), and/or another type of M2M communication. UEs 110 may be embodied as Internet of things (IoT) devices, which may include health monitoring devices, asset tracking devices (e.g., a system monitoring the geographic location of a fleet of vehicles, etc.), sensors (e.g., utility sensors, traffic monitors, etc.)

Access network 120 may provide access to WAN 140 for UEs 110. Access network 120 may enable UEs 110 to connect to WAN 140 for IP services and/or non-IP data delivery (NIDD) services, mobile telephone service, Short Message Service (SMS), Multimedia Message Service (MMS), multimedia broadcast multicast service (MBMS), Internet access, cloud computing, and/or other types of data services.

Access network 120 may establish or may be incorporated into a packet data network connection between UE 110 and WAN 140 via one or more APNs. For example, access network 120 may establish a non-IP connection between UE 110 and WAN 140. Furthermore, through an APN, access network 120 may enable UE 110 to communicate with AS 150 via WAN 140. As will be described in more detail below, UE 110 may be able to use a generic non-IP APN to perform a first authorization with access network 120 for a NIDD service, which in turn causes access network 120 to complete the authorization process with a second authorization using a specific non-IP APN.

In some implementations, access network 120 may include a Long Term Evolution (LTE) access network (e.g., an evolved packet core (EPC) network). In other implementations, access network 120 may include a Code Division Multiple Access (CDMA) access network. For example, the CDMA access network may include a CDMA enhanced High Rate Packet Data (eHRPD) network (which may provide access to an LTE access network).

Furthermore, access network 120 may include an LTE Advanced (LTE-A) access network and/or a 5G access network or other advanced network that includes functionality such as 5G new radio (NR) base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

As described herein, access network 120 may include base stations 130-A to 130-N (referred to herein collectively as "base stations 130" and individually as "base station 130"). Each base station 130 may service a set of UEs 110. For example, base station 130-A may service UEs 110-A and 110-B, and base station 130-N may service UE 110-N. Base station 130 may include a 5G base station (e.g., a gNodeB) that includes one or more radio frequency (RF) transceivers (also referred to as "cells" and/or "base station sectors") facing particular directions. For example, base station 130 may include three RF transceivers and each RF transceiver may service a 120° sector of a 360° field of view. Each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UEs 110 and may simultaneously generate up to k antenna beams. A particular antenna beam may service multiple UEs 110. In some implementations, base station 130 may also include a 4G base station (e.g., an eNodeB).

WAN 140 may include any type of wide area network, a metropolitan area network (MAN), an optical network, a video network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of WAN 140 may be managed by a provider of communication services that also manages access network 120 and/or UEs 110. WAN 140 may allow the delivery of IP and/or non-IP services to/from UE 110, and may interface with other external networks. WAN 140 may include one or more server devices and/or network devices, or other types of computation or communication devices. In some implementations, WAN 140 may include an IP Multimedia Sub-system (IMS) network (not shown in FIG. 1). An IMS network may include a network for delivering IP multimedia services and may provide media flows between UE 110 and external IP networks or external circuit-switched networks (not shown in FIG. 1).

Application server (AS) 150 may include one or more devices, such as computer devices, databases, and/or server devices, that facilitate non-IP data delivery services. Such services may include supporting IoT applications such as alarms, sensors, medical devices, metering devices, smart home devices, wearable devices, retail devices, etc. Other services may be also be supported such as communications applications (e.g., short message service (SMS), etc.), automotive applications, aviation applications, etc. AS 150 may communicate with UEs 110 over access network 120 using IP and/or non-IP bearer channels. While only one AS 150 is shown in FIG. 1, in various embodiments, multiple application servers may be associated with different entities and used within environment 100. Application servers 150 may be supported by service providers associated with various organizations (e.g., companies, non-profits, collaborative enterprises, etc.).

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
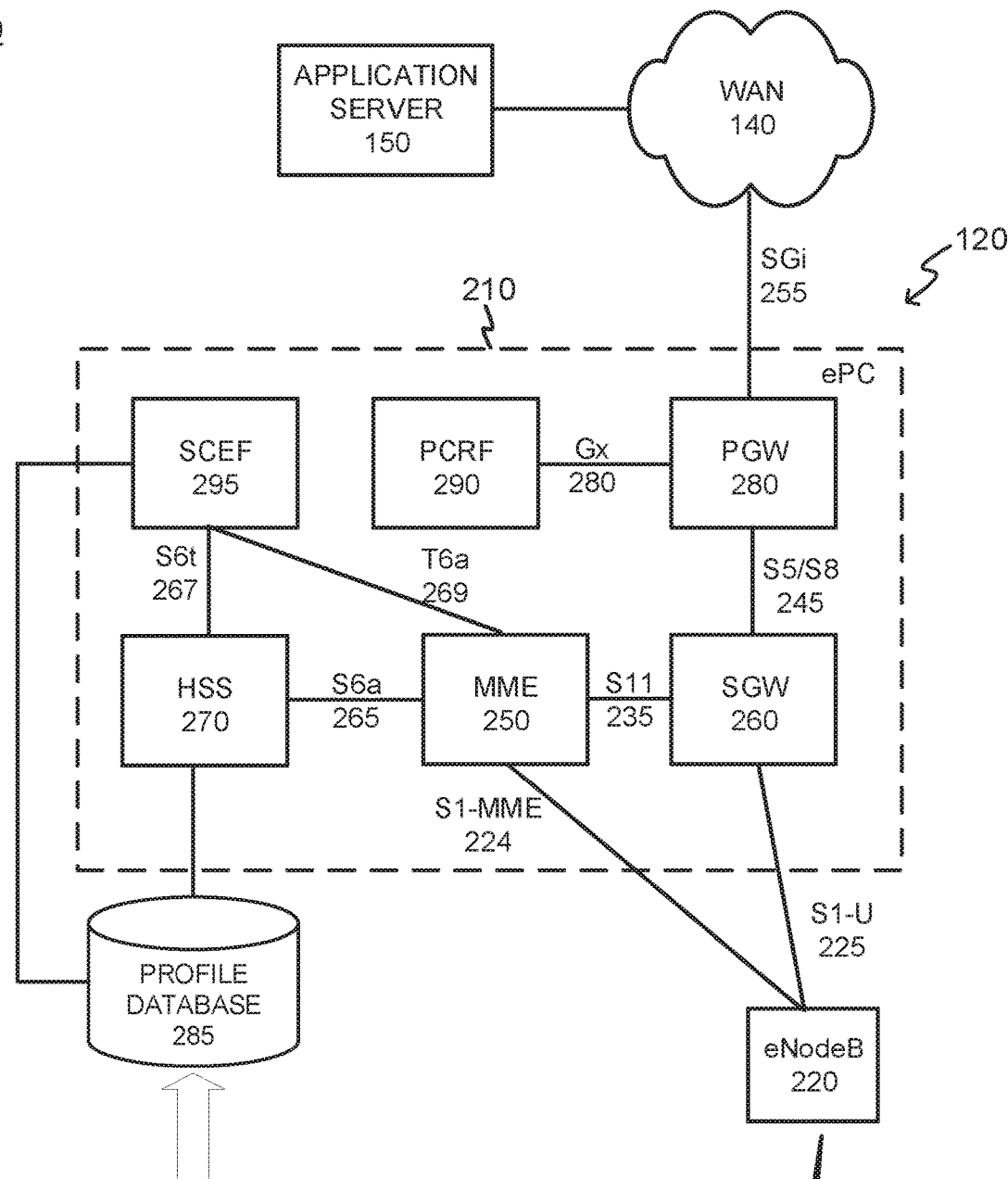
FIG. 2 is a block diagram of an exemplary system having an access network based on an LTE standard.

FIG. 2 is a block diagram of an exemplary networking system 200 including access network 120 based on the LTE standard. Access network 120 may include an LTE network with an evolved Packet Core (ePC) 210 and eNodeB 220 (corresponding, for example, to base station 130). UE 110 and eNodeB 220 may exchange data over a radio access technology (RAT) based on LTE air channel interface protocols. In the embodiment shown in FIG. 2, ePC 210 may operate in conjunction with an evolved Universal Mobile Telecommunications System (UMTS) Terrestrial Network (eUTRAN) that includes at least one eNodeB 220. Networking system 200 may further include an Internet Protocol (IP) network and/or a non-IP network, which may be embodied separately or included in a backhaul network (not shown) and/or in WAN 140. EPC 210 may also be connected to a profile database 285 which may include information of various NIDD organizations (e.g., service providers). As shown in FIG. 2, AS 150 may be connected to WAN 140 over a wired or wireless connection, using, for example, transmission control protocol/internet protocol (TCP/IP) and/or using a non-IP based protocol.

EPC 210 may include one or more devices that are physical and/or logical entities interconnected via standardized interfaces. EPC 210 provides wireless packet-switched services and wireless packet connectivity to user devices to provide, for example, data, voice, and/or multimedia services. EPC 210 may further include a mobility management entity (MME) 250, a serving gateway (SGW) 260, a home subscriber server (HSS) 270, a packet data network gateway (PGW) 280, a Policy and Charging Rules Function (PCRF) 290, and a SCEF 295. It is noted that FIG. 2 depicts a representative networking system 200 with exemplary components and configuration shown for purposes of explanation. Other embodiments may include additional or different network entities in alternative configurations than which are exemplified in FIG. 2.

Further referring to FIG. 2, eNodeB 220 may include one or more devices and other components having functionality that allows UE 110 to wirelessly connect via the RAT of eNodeB 220. ENodeB 220 may interface with ePC 210 via a S1 interface, which may be split into a control plane S1-MME interface 224 and a data plane S1-U interface 225. EnodeB 220 may interface with MME 250 via S1-MME interface 224, and interface with SGW 260 via S1-U interface 225. S1-U interface 226 may be implemented, for example, using GTP. S1-MME interface 224 may be implemented, for example, with a protocol stack that includes a Non-Access Stratum (NAS) protocol and/or Stream Control Transmission Protocol (SCTP).

MME 250 may implement control plane processing for both the primary access network and the secondary access network. For example, through eNodeB 220, MME 250 may implement tracking and paging procedures for UE 110, may activate and deactivate bearers for UE 110, and may authenticate a user of UE 110 to provide normal coverage service for operating in normal UE device mode. MME 250 may also select a particular SGW 260 for a particular UE 110. MME 250 may interface with other MMEs (not shown) in ePC 210 and may send and receive information associated with UEs 110, which may allow one MME 250 to take over control plane processing of UEs serviced by another MME 250, if the other MME becomes unavailable.

SGW 260 may provide an access point to and from UE 110, may handle forwarding of data packets for UE 110, and may act as a local anchor point during handover procedures between eNodeBs 220. SGW 260 may interface with PGW 280 through an S5/S8 interface 245. S5/S8 interface 245 may be implemented, for example, using GTP.

PGW 280 may function as a gateway to WAN 140 through a SGi interface 255. WAN 140 may provide various services (e.g., over the top voice services) to UE 110. A particular UE 110, while connected to a single SGW 260, may be connected to multiple PGWs 280, one for each packet network with which UE 110 communicates.

Alternatively, UE 110 may exchange data with WAN 140 though a WiFi wireless access point (WAP) (not shown). The WiFi WAP may be part of a local area network, and access WAN 140 through a wired connection via a router. Alternatively, the WiFi WAP may be part of a mesh network (e.g., 802.11s). The WiFi WAP may operate in accordance with any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or or a WiMAX IEEE 802.16. The WiFi WAP may also be part of a wide area network (WiMAX) or a mesh network (802.11s).

MME 250 may communicate with SGW 260 through an S11 interface 235. S11 interface 235 may be implemented, for example, using GTPv2. S11 interface 235 may be used to create and manage a new session for a particular UE 110. S11 interface 235 may be activated when MME 250 needs to communicate with SGW 260, such as when the particular UE 110 attaches to ePC 210, when bearers need to be added or modified for an existing session for the particular UE 110, when a connection to a new PGW 280 needs to be created, or during a handover procedure (e.g., when the particular UE 110 needs to switch to a different SGW 260).

HSS 270 may store information associated with UE 110 and/or information associated with users of UE 110. For example, HSS 270 may store user profiles that include registration, authentication, and access authorization information. MME 250 may communicate with HSS 270 through an S6a interface 265. S6a interface 265 may be implemented, for example, using a Diameter protocol.

Profile database 285 may be a network or computational device that may store and retrieve information of organizations associated with NIDD services (e.g., NIDD service providers). A customer provisioning system (not shown) may interface with profile database 285 to receive various enterprise profiles. Profile database 285 may also interface with HSS 270 and SCEF 295 directly through ePC 210, and/or may interface through WAN 140 (not shown). The information stored within profile database 285 may include organization identifiers of the NIDD service, application server names, and specific APN associated with the application server for the NIDD service. For example, as shown in FIG. 2, profile database 284 shows the contents of two profiles for enterprise ABC and enterprise XYZ. For enterprise ABC, the organization identifier is "abc", the AS identifier is "app-abc", and the APN OIA is "abc.scef.apn.epc.mnc270.mcc311.3gppnetwork.org". For enterprise XYZ, the organization identifier is "xyz", the AS identifier is "app-xyz", and the APN OIA is "xyz.scef.apn.epc.mnc270.mcc311.3gppnetwork.org". Embodiments herein may use information from the profile database 285 to generate specific non-IP APN as will be described in more detail below.

PCRF 290 provides policy control decision and flow based charging control functionalities. PCRF 290 may provide network control regarding service data flow detection, gating, QoS and flow based charging, etc. PCRF 290 may determine how a certain service data flow shall be treated, and may ensure that user plane traffic mapping and treatment is in accordance with a user's subscription profile based, for example, on a specified quality of service (QoS) class identifier (QCI). PCRF 290 may communicate with PGW 280 using a Gx interface 280. Gx interface 280 may be implemented, for example, using a Diameter protocol.

SCEF 295 may include a network or computational device that provides exposure of 3GPP network service capabilities to third party applications. Specifically, SCEF 295 may provide network events through application programming interfaces (APIs) to external applications which may reside on application servers 150 and/or UEs 110. Exposure of the various events may include, for example: UE 110 reachability; UE 110 loss of connectivity; UE 110 location reporting; UE 110 roaming status; communication failure; and change of international mobile equipment identifier—international mobile subscriber identifier (IMEI-IMSI) association. SCEF 295 may facilitate NIDD services through a non-IP packet data network (PDN) established through SCEF 295. In one implementation, SCEF 295 may exchange control plane signaling with MME 250 (via a T6a interface 269 using Diameter protocol) and/or HSS 270 (via an Sh or S6t interface 267). In one implementation, SCEF 295 may be included as part of a control plane bearer path between UE device 110 and AS 150. According to an implementation described herein, SCEF 295 may act as a gateway for connecting UE 110 to AS 150. Generally, SCEF 205 may expose application-programming interfaces (APIs) for multiple application servers (such as AS 150) to access network services to communicate with UEs 110. SCEF 295 may communicate with MME 250 via a modified T6a interface relative to a standardized T6a interface.

While FIG. 2 shows exemplary components of networking system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
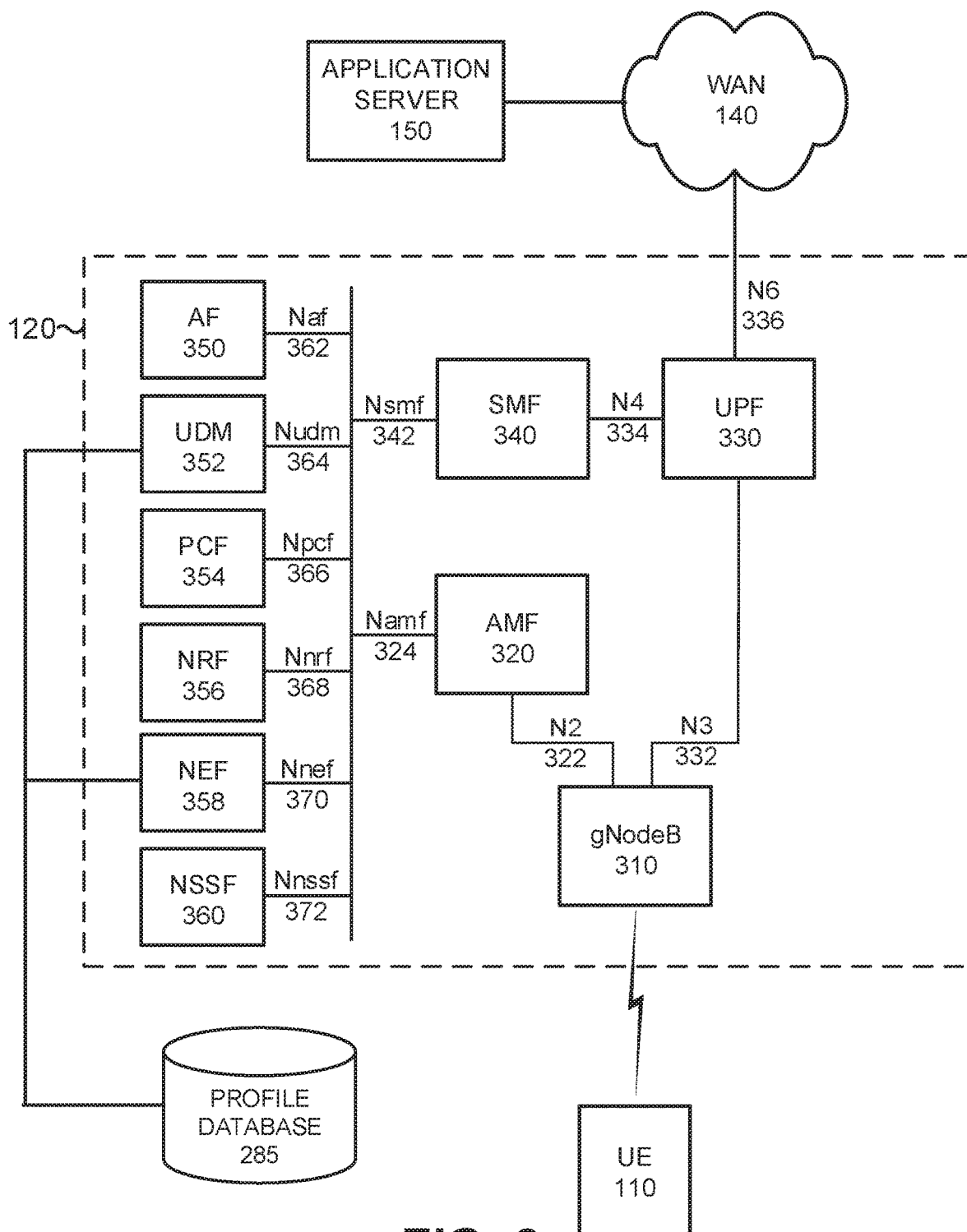
FIG. 3 is a block diagram of an exemplary system having an access network based on a 5G standard.

FIG. 3 is a block diagram of an exemplary system 300 having an access network 120 based on a 5G standard. As shown in FIG. 3, system 300 may include UE 110, access network 120, WAN 140, application server 150, and profile database 285.

Access network 120 may include a gNodeB 310 (corresponding to base station 130), an Access and Mobility Function (AMF) 320, a User Plane Function (UPF) 330, a Session Management Function (SMF) 340, an Application Function (AF) 350, a Unified Data Management (UDM) 352, a Policy Control Function (PCF) 354, a Network Repository Function (NRF) 356, a Network Exposure Function (NEF) 358, and a Network Slice Selection Function (NSSF) 360. While FIG. 3 depicts a single gNodeB 310, AMF 320, UPF 330, SMF 340, AF 350, UDM 352, PCF 354, NRF 356, NEF 358, and/or NSSF 360 for exemplary illustration purposes, in practice, FIG. 3 may include multiple gNodeBs 310, AMFs 320, UPFs 330, SMFs 340, AFs 350, UDMs 352, PCFs 354, NRFs 356, NEFs 358, and NSSFs 360.

gNodeB 310 may include one or more devices (e.g., base stations) and other components and functionality that enable UE 110 to wirelessly connect to access network 120 using 5G NR Radio Access Technology (RAT). For example, gNodeB 310 may include one or more cells, with each cell including a wireless transceiver with an antenna array configured for millimeter-wave wireless communication. gNodeB 310 may implement one or more RAN slices to partition access network 120. gNodeB 310 may communicate with AMF 320 using an N2 interface 322 and communicate with UPF 330 using an N3 interface 332.

AMF 320 may perform registration management, connection management, reachability management, mobility management, lawful intercepts, Short Message Service (SMS) transport between UE 110 and an SMS function (not shown in FIG. 3), session management messages transport between UE 110 and SMF 340, access authentication and authorization, location services management, functionality to support non-3GPP access networks, and/or other types of management processes. In some implementations, AMF 320 may implement some or all of the functionality of managing RAN slices in gNodeB 310. AMF 320 may be accessible by other function nodes via a Namf interface 324.

UPF 330 may maintain an anchor point for intra/inter-RAT mobility, maintain an external Packet Data Unit (PDU) point of interconnect to a data network (e.g., WAN 140), perform packet routing and forwarding, perform the user plane part of policy rule enforcement, perform packet inspection, perform lawful intercept, perform traffic usage reporting, enforce QoS policies in the user plane, perform uplink traffic verification, perform transport level packet marking, perform downlink packet buffering, send and forward an "end marker" to a Radio Access Network (RAN) node (e.g., gNodeB 310), and/or perform other types of user plane processes. UPF 330 may communicate with SMF 340 using an N4 interface 334 and connect to WAN 140 using an N6 interface 336.

SMF 340 may perform session establishment, modification, and/or release, perform IP address allocation and management, perform Dynamic Host Configuration Protocol (DHCP) functions, perform selection and control of UPF 330, configure traffic steering at UPF 330 to guide traffic to the correct destination, terminate interfaces toward PCF 354, perform lawful intercepts, charge data collection, support charging interfaces, control and coordinate of charging data collection, termination of session management parts of network access stratum (NAS) messages, perform downlink data notification, manage roaming functionality, and/or perform other types of control plane processes for managing user plane data. SMF 340 may be accessible via an Nsmf interface 342.

AF 350 may provide services associated with a particular application, such as, for example, application influence on traffic routing, accessing NEF 358, interacting with a policy framework for policy control, and/or other types of applications. AF 350 may be accessible via a Naf interface 362.

UDM 352 may maintain subscription information for UE 110, manage subscriptions, generate authentication credentials, handle user identification, perform access authorization based on subscription data, perform network function registration management, maintain service and/or session continuity by maintaining assignment of SMF 340 for ongoing sessions, support SMS delivery, support lawful intercept functionality, and/or perform other processes associated with managing user data. UDM 352 may be accessible via a Nudm interface 364. Profile database 285, described above, may interface with UDM 352 and NEF 358 directly through access network 120, or through WAN 140 (not shown).

PCF 354 may support policies to control network behavior, provide policy rules to control plane functions (e.g., to SMF 340), access subscription information relevant to policy decisions, execute policy decisions, and/or perform other types of processes associated with policy enforcement. PCF 354 may be accessible via Npcf interface 366. PCF 354 may specify QoS policies based on QoS flow identity (QFI) consistent with 5G network standards.

NRF 356 may support a service discovery function and maintain a profile of available network function (NF) instances and their supported services. An NF profile may include an NF instance identifier (ID), an NF type, a Public Land Mobile Network (PLMN) ID associated with the NF, a network slice ID associated with the NF, capacity information for the NF, service authorization information for the NF, supported services associated with the NF, endpoint information for each supported service associated with the NF, and/or other types of NF information. NRF 356 may be accessible via an Nnrf interface 368.

NEF 358 may expose capabilities, events, and/or status to other NFs, including third party NFs, AFs, edge computing NFs, and/or other types of NFs. For example, NEF 358 may provide capabilities and events/status of UE 110 to AS 150. Furthermore, NEF 358 may secure provisioning of information from external applications to access network 120, translate information between access network 120 and devices/networks external to access network 120, support a Packet Flow Description (PFD) function, and/or perform other types of network exposure functions. NEF 358 may be accessible via Nnef interface 370.

NSSF 360 may select a set of network slice instances to serve a particular UE 110, determine network slice selection assistance information (NSSAI), determine a particular AMF 320 to serve a particular UE 110, and/or perform other types of processes associated with network slice selection or management. In some implementations, NSSF 360 may implement some or all of the functionality of managing RAN slices in gNodeB 310. NSSF 360 may be accessible via Nnssf interface 372.

Although FIG. 3 shows exemplary components of access network 120, in other implementations, access network 120 may include fewer components, different components, differently arranged components, or additional components than depicted in FIG. 3. Additionally or alternatively, one or more components of access network 120 may perform functions described as being performed by one or more other components of access network 120. For example, access network 120 may include additional function nodes not shown in FIG. 3, such as an Authentication Server Function (AUSF), a Non-3GPP Interworking Function (N3IWF), a Unified Data Repository (UDR), an Unstructured Data Storage Network Function (UDSF), an SMS function (SMSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 3, additionally or alternatively, access network 120 may include a reference point architecture that includes point-to-point interfaces between particular function nodes.

FIG. 4 is a block diagram showing exemplary components of a network device 400 according to an embodiment. Network device 400 may include one or more network elements illustrated in FIG. 2 and/or FIG. 3, such as, for example, MME 250, AMF 320, HSS 270 UDM 352, SCEF 295, and/or NEF 358, etc. In some embodiments, there may be a plurality of network devices 400 providing functionality of one or more network elements. Alternatively, once network device 400 may perform the functionality of any plurality of network elements. Network device 400 may include a bus 410, a processor 420, a memory 430, storage device 440, a network interface 450, input device 460, and an output device 470.

Bus 410 includes a path that permits communication among the components of network device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x86 based CPU, and may use any operating system, which may include varieties of the Windows, UNIX, and/or Linux operating systems. Processor 420 may also use high-level analysis software packages and/or custom software written in any programming and/or scripting languages for interacting with other network entities are communicatively coupled to WAN 140.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read only memory (ROM) device or another type of static storage device, and/or a removable form of memory, such as a flash memory. Storage device 440 may include any type of on-board device suitable for storing large amounts of data, and may include one or more hard drives, solid state drives, and/or various types of redundant array of independent disks (RAID) arrays. In an embodiment, storage device 440 may store profile data associated with UEs 110.

Network interface 450 may include a transceiver that enables network device 150 to communicate with other devices and/or systems in network environment 100. Network interface 450 may be configured to exchange data with WAN 140 over wired communications (e.g., conductive wire, twisted pair cable, coaxial cable, transmission line, fiber optic cable, and/or waveguide, etc.), or a combination of wireless. In other embodiments, network interface 450 may interface with wide area network 140 using a wireless communications channel, such as, for example, radio frequency (RF), infrared, and/or visual optics, etc. Network interface 450 may include a transmitter that converts baseband signals to RF signals and/or a receiver that converts RF signals to baseband signals. Network interface 450 may be coupled to one or more antennas for transmitting and receiving RF signals. Network interface 450 may include a logical component that includes input and/or output ports, input and/or output systems, and/or other input and output components that facilitate the transmission/reception of data to/from other devices. For example, network interface 450 may include a network interface card (e.g., Ethernet card) for wired communications and/or a wireless network interface (e.g., a WiFi) card for wireless communications. Network interface 450 may also include a universal serial bus (USB) port for communications over a cable, a Bluetooth® wireless interface, an radio frequency identification device (RFID) interface, a near field communications (NFC) wireless interface, and/or any other type of interface that converts data from one form to another form.

As described below, network device 400 may perform certain operations relating to network based NIDD service authorization. Network device 400 may perform these operations in response to processor 420 executing software instructions contained in a computer-readable medium, such as memory 430 and/or storage device 440. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software. In an embodiment, the software instructions and/or hardware circuitry may perform the process exemplified by the signal flows in FIGS. 5A-5C and the flow chart shown in FIG. 6.

Although FIG. 4 shows exemplary components of network device 400, in other implementations, network device 400 may include fewer components, different components, additional components, or differently arranged components than depicted in FIG. 4.

Figure 5A:
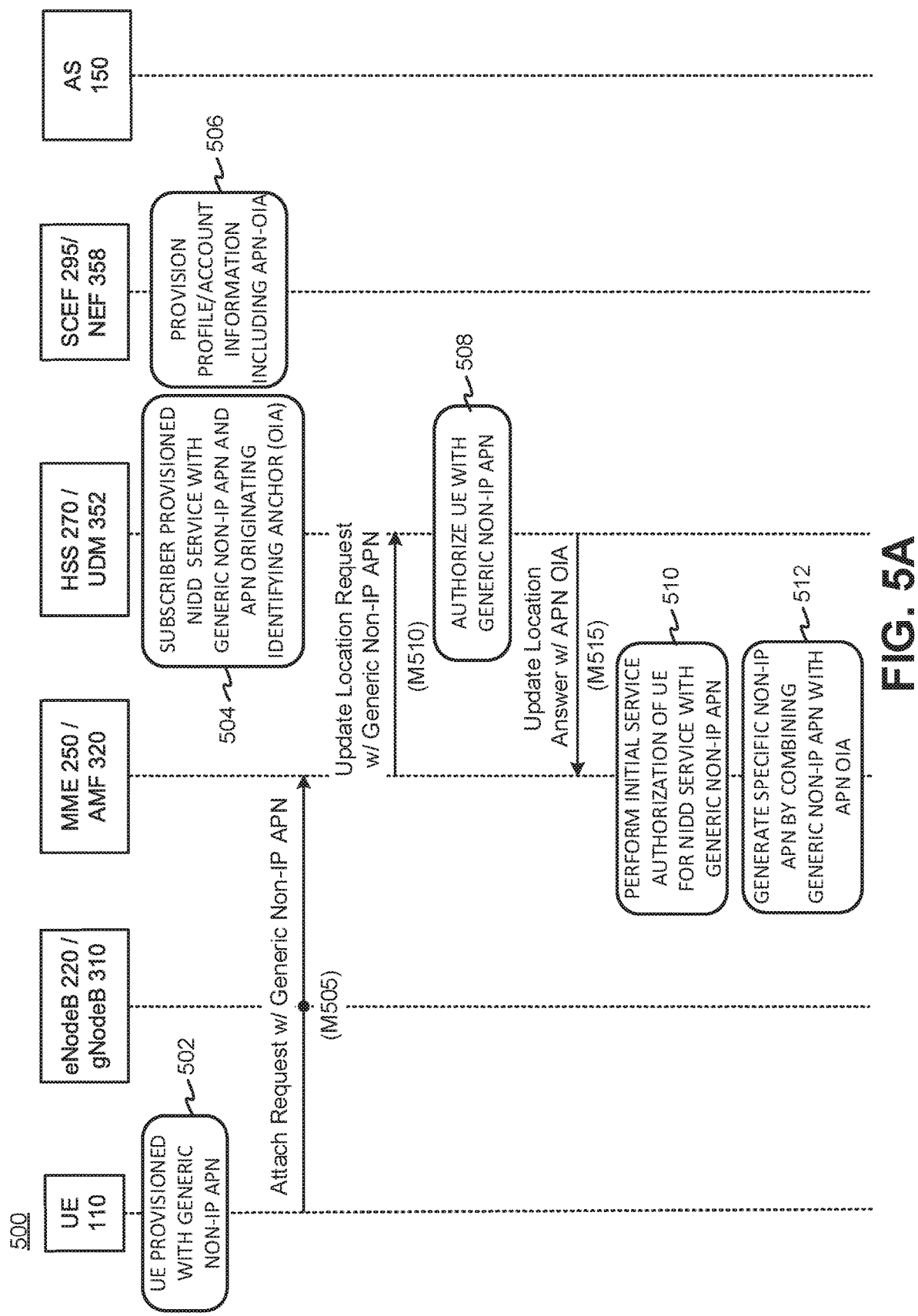
FIGS. 5A-5C are diagrams showing exemplary message flows within a networking system for authorizing a non-IP data delivery service.
Figure 5B:
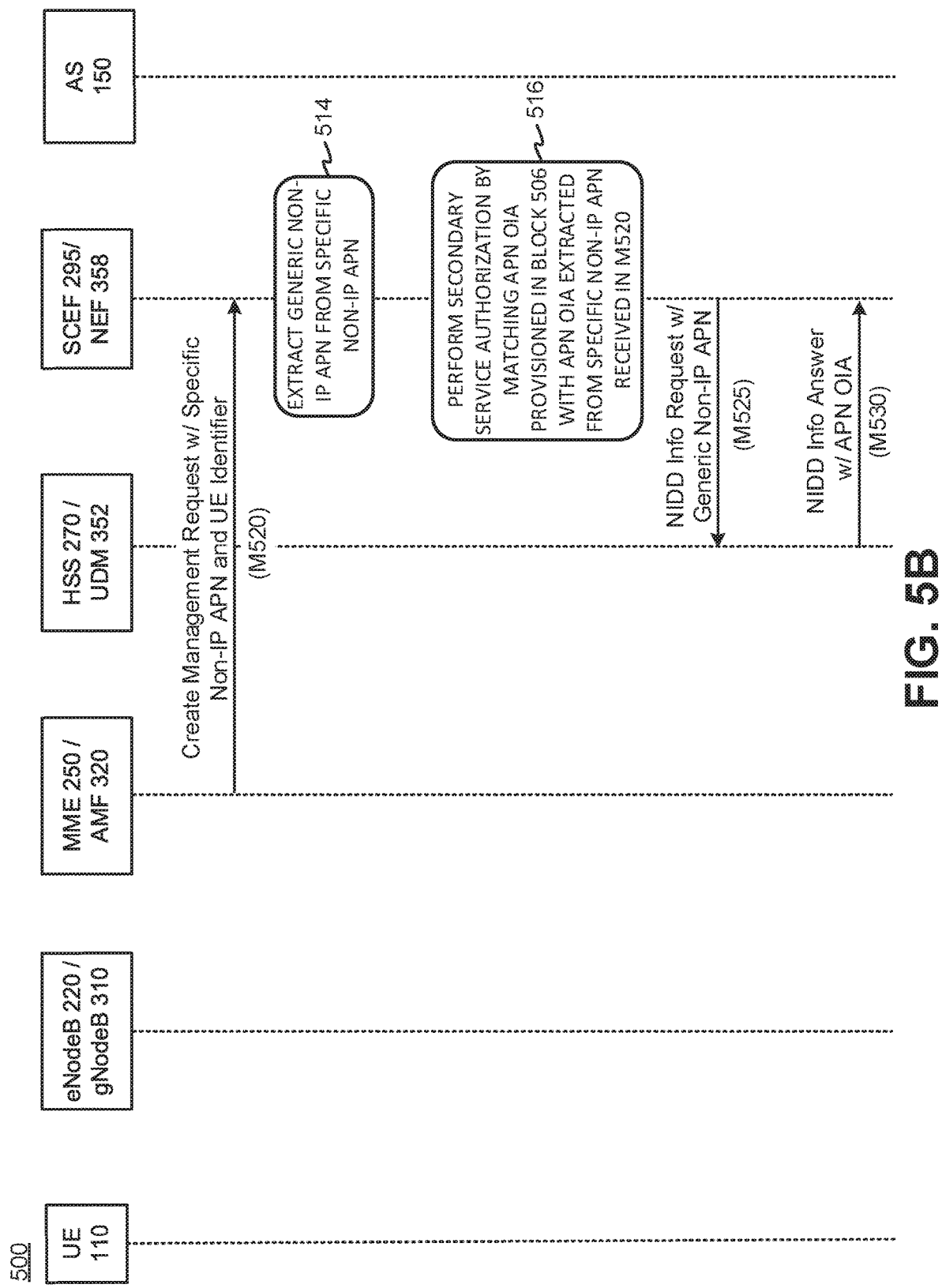
Figure 5C:
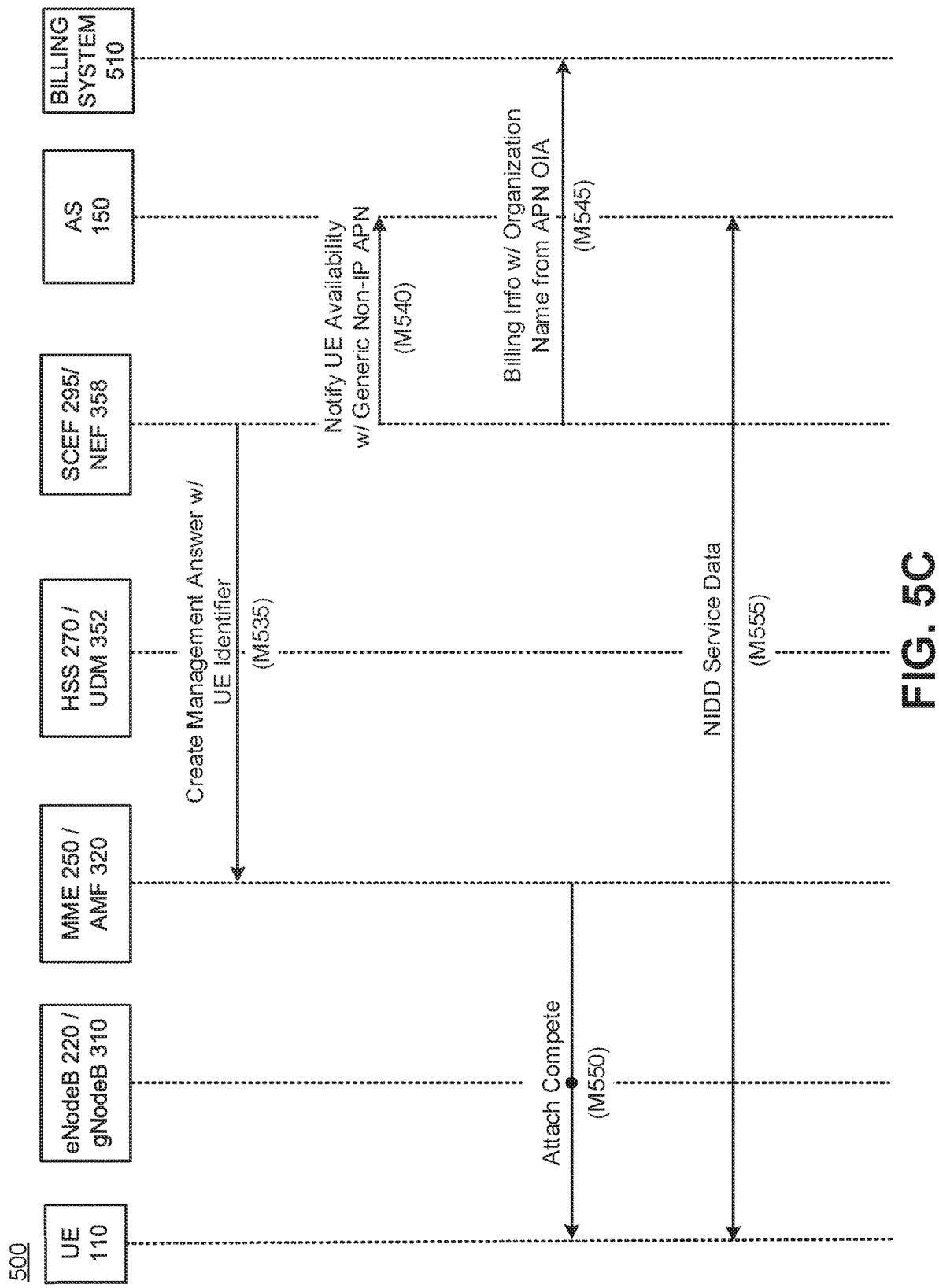

FIGS. 5A-5C are diagrams showing exemplary message flows within a networking system 200 and/or 300 for authorizing a non-IP data delivery service. The message flow diagrams show network components which may correspond both LTE and 5G network standards. The LTE components are shown with the label "2XX" and the 5G components are shown with the label "3XX." For example, as shown in FIGS. 5A-5C, the base station elements are shown as "eNode 220/gNode 310," the mobility managers are shown as "MME 250/AMF 320," etc.

Provisioning of various network elements may occur prior to the exchange of messages to facilitate authorization for an NIDD service. In one implementation, the source of provisioning data may be profile database 285. For example, UE 110 may be provisioned with generic non-IP APN (502) that be used for a home network and/or a roaming network. For example, the generic non-IP APN may be set to the character value "vzwscef". The generic non-IP APN may be stored in a subscriber identity module (SIM) card or other non-volatile storage of UE 110, which may be set by the manufacturer and/or the network operator. In an embodiment UE 110, however, is not provisioned, configured, and/or manufactured with specific non-IP APN as may be done conventionally. For each UE 110 (which may also be associated with the subscriber), the HSS 270/UDM 352 may be provisioned with attribute value pairs including the generic non-IP APN and the APN Originating Identifying Anchor (OIA) associated with an NIDD service (504). The APN OIA may include a specific organization name associated with the NIDD service and APN information identifying AS 150 associated with the NIDD service. For example, APN OIA may be set to the character values "orgainizationName.apn.mnc270.mcc311.3gppnetwork.org" (note exemplary contents of profile database 285 are shown in FIG. 2). SCEF 295/NEF 358 may be provisioned with a profile and/or account information of organization associated with the NIDD service, which may include an organization identifier, an APN OIA, and/or an identifier for AS 150 (506). The organization may be a service provider for the NIDD service, a sponsor for the NIDD service, or an entity affiliated with the NIDD service. Provider profiles may be established by populating profile database 285 with enterprise profiles for each organization (e.g., each NIDD service provider), and subsequently pushing profile information out to network devices for provisioning. For example, the networks information technology/operations support system (IT/OSS) (not shown) may access profile database 285 and provision HSS 270/UDM 352 in Block 504, and SCEF 294/NEF 358 in Block 506, as shown in FIG. 5A. Profile database 285 may populated with a provisioning system (not shown) that may be access directly by an organization associated with the NIDD service (e.g., a provider) or by the network operator. Thus, access network 120 can easily support trial customers and/or factory devices with NIDD services without having to go through complex business application onboarding processes.

UE 110 may send an attach request to MME 250/AMF 320, where the attach request may include the generic non-IP APN and the international mobile subscriber identity (IMSI) (M505). In other embodiments, the international mobile equipment identity (IMEI) may be sent. Upon receiving the attach request from UE 110, MME 250/AMF 320 may send an update location request to the HSS 270/ UDM 352 (M510). The update location request for the NIDD service may include the generic non-IP APN. HSS 270/UDM 352 may authorize UE 110 for the NIDD service using the generic non-IP APN (508). HSS 270/UDM352 may then respond to the update location request and send an update location answer along with the APN OIA to MME 250/AMF 320 (M515). MME 250/AMF 320 may perform an initial service authorization of UE 110 for the NIDD service using the generic non-IP APN (510). MME 250/ AMF 320 may then generate a specific non-IP APN by combining the generic non-IP APN with the APN OIA (512). For example, a specific non-IP APN name may be set to the character values:

"vzwsceforganizationname.apn.mnc270.mcc311.3gppnetwork.org"

Referring to FIG. 5B, MME 250/AMF 320 may send a create management request (CMR) to SCEF 295/NEF 358 (M520). CMR M520 may include the specific non-IP APN, a UE Identifier (which may include an IMEI and/or an IMSI) and a bearer identifier (e.g., character values "xyz." Upon receiving CMR M520, SCEF 295/NEF 358 may extract the generic non-IP APN from the specific non-IP APN (514). In an embodiment, SCEF 295/NEF 358 may then perform a secondary service authorization at an account level by matching information extracted from the specific non-IP APN included in the CMR message M520 with the account and/or profile information previously provisioned in SCEF 295/NEF 358 in block 506 (516). This operation may be performed one time initially for a UE 110 and cached for subsequent authorizations. In an embodiment, if the information was provisioned in Block 506, SCEF 295/NEF 356 may validate the received provisioning information (e.g., APN OIA) prior to performing a secondary service authorization.

SCEF 295/NEF 358 may send a NIDD information request to HSS 270/UDM 352 (M525). NIDD information request M525 may include the generic non-IP APN and the UE identifier. In response, HSS 270/UDM 352 may send an NIDD information answer to SCEF 295/NEF 358 (M530). NIDD information answer M530 may include the APN OIA, an external identifier, and an authorization status.

Optionally, in another embodiment, if the SCEF 295/NEF 358 was not previously provisioned with the APN OIA in block 506, the secondary service authorization may be delayed until after NIDD Info Answer M530 is received by SCEF 295/NEF 358. Accordingly, SCEF 295/NEF 358 may then match the APN OIA received in the NIDD information answer M530 with the APN OIA extracted from the specific non-IP APN in block 514. As described above, embodiments perform authorization for NIDD services without AS 150 registration, which may reduce SCEF 295/NEF 358 context usage. Furthermore, AS 150 no longer needs to track and/or maintain registration information associated with UE 110.

Referring to FIG. 5C, SCEF 295/NEF 358 may send a create management answer to MME 250/AMF 320 (M535). The create management answer M535 may include the UE identifier, and the authorization status. SCEF 295/NEF 358 may also send a notification message to AS 150 regarding the availability of UE 110 (M540). The notification message may include an external identifier of UE 110, such as, for example, a Mobile Station International Subscriber Directory Number (MSISDN). The notification message may further include the generic non-IP APN, an application server name, an external identifier, and/or a status indicator regarding the availability of UE 110 (e.g., "reachable"). In an embodiment, security may be improved by avoiding the exposure of sensitive or "internal" information (such as the APN OIA and/or the IMSI of UE 110) to the AS 150 in notification message M540. SCEF 295/NEF 358 may then send billing information to a billing system 510 (M545). The billing information may include the organization name associated with the NIDD service, a UE identifier, information about the Non-IP session, and the specific non-IP APN. The MME 250/AMF 320 may send an attach complete message to UE 110 (M550). The attach complete message may include an IMSI and the status regarding authorization for the NIDD service. UE 110 may then exchange NIDD service data with AS 150 (M555).

Figure 6:
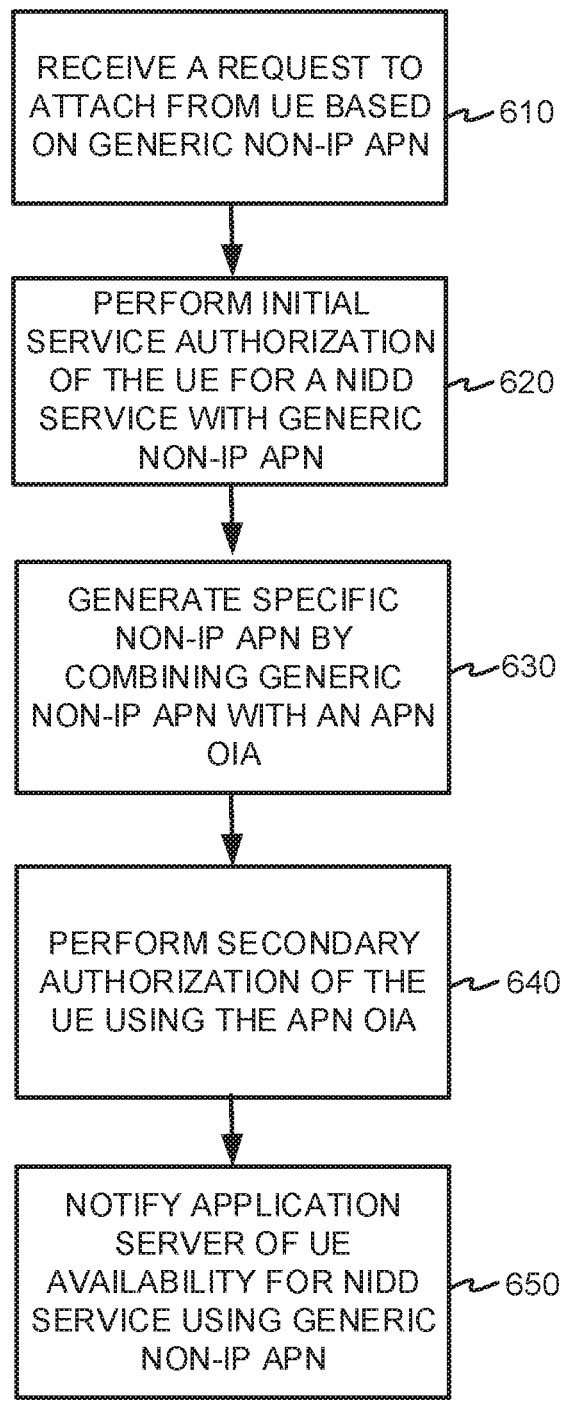
FIG. 6 is a flow chart showing an exemplary process for authorizing a non-IP data delivery service according to an embodiment.

FIG. 6 is a flow chart showing an exemplary process 600 for authorizing a NIDD service. Process 600 may be performed by network device 400, having processor 420 executing instructions stored in memory 430 and/or stored in mass storage device 440. Network device may perform the functionality of one or more devices such as MME 250 and/or SCEF 295 in LTE networks, and/or AMF 320 and/or NEF 358 in 5G networks. Network device 400 may be embodied as a single device performing multiple network functions, or as separate network devices each performing specific network functions.

Processor 420 may initially receive a request from UE 110 to attach to an access network based on a generic non-internet protocol (IP) access point name (APN) (610). Processor 420 may perform an initial service authorization of the UE for a non-IP data delivery (NIDD) service with the generic non-IP APN (620). In an embodiment, performing the initial service authorization of the NIDD service may occur at MME 250/AMF 320, either in a home or visiting network. The initial service authorization for UE 110 may begin by processor 420 sending an update location request, along with the generic non-IP APN, to HSS 270/UDM 352. The update location request may include at least a UE 110 identifier (e.g., a UE ID), radio access technology (RAT) information, terminal information, features supported by UE 110, and/or a visiting PLMN-ID. Upon receiving the update location request sent by MME 250/AMF 320, HSS 270/UDM 352 may retrieve user/subscriber data associated with UE 110, as HSS 270/UDM 352 stores subscription data associated with UE 110, including the generic non-IP APN for service authorization and the non-IP APN OIA used in subsequent processes described below. HSS 270/UDM 352 may generate and provide an update location answer for MME 250/AMF 320. Accordingly, processor 420 may receive the update location answer that includes the APN OIA from HSS 270/UDM 352.

In an embodiment, SCEF 295/NEF 358 may receive a reference APN OIA from profile database 285 during provisioning. SCEF 295/NEF 358 may then validate the reference APN OIA received from the profile database. In other embodiments, the APN OIA may be validated by an information technology/operations support system prior to storage in profile database 285 and/or upon retrieval from profile database 285, prior to provisioning HSS 270/UDM 352 and/or SCEF 295/NEF 358.

When the APN OIA is present in the update location answer, processor 420 may generate a specific non-IP APN by combining the generic non-IP APN with the APN OIA, where the APN OIA may identify an organization associated with the NIDD service (630). The organization may be a provider of the NIDD service. In an embodiment, the specific non-IP APN may be generated by MME 250/AMF 320 in a home network by concatenating information provided in the generic non-IP APN and the APN OIA.

Processor 420 may perform a secondary service authorization within the access network using the APN OIA (640).

In an embodiment, the APN OIA used in the secondary service authorization may be derived from the specific non-IP APN. The secondary service authorization may be performed by SCEF 295/NEF 358, which may receive the APN OIA within the specific non-IP APN sent by MME 250/AMF 320 in a create management request. In an embodiment, performing the secondary service authorization may include processor 420 extracting a copy of the APN OIA from the specific non-IP APN, and determining a match between the extracted copy of the APN OIA and the reference APN OIA.

In another embodiment, processor 420 may send a NIDD information request that includes the generic non-IP APN. Processor 420 may receive an NIDD information answer that includes the APN OIA. Processor 420 may further validate the APN OIA received from the NIDD information answer to authorize the NIDD service based on an organization identifier. In an embodiment, validating the APN OIA may include processor 420 extracting a first copy of the APN OIA from the specific non-IP APN, and comparing the extracted APN OIA and the APN OIA received in the NIDD information answer to determine a match.

If no match exists, the NIDD service may be denied. In an embodiment, validating the APN may include processor 420 notifying AS 150 of the UE availability for NIDD service using the generic non-IP APN (650).

Processor 420 may also send a notification to a billing system for charging an account associated with the NIDD service, wherein the notification includes an organization identifier. In an embodiment, processor 420 may further correlate the UE with the account service associated with the NIDD service.

In an embodiment, receiving the request to attach may include processor 420 receiving the request from UE 110 via a home network or a roaming network, where UE 110 is provisioned with the generic non-IP APN stored within a subscriber identity module (SIM) or other non-volatile storage.

The foregoing description of implementations provides illustration and description, but is not intended to be exhaustive or to limit the invention to the precise form disclosed. Various preferred embodiments have been described with reference to the accompanying drawings. It will be evident that modifications and changes may be made thereto, and additional embodiments may be implemented, without departing from the broader scope of the invention as set forth in the claims that follow. For example, while series of messages, states, and/or blocks have been described with regard to FIGS. 5A-5C and 6, the order of the messages, states, and/or blocks may be modified in other embodiments. Further, non-dependent messaging and/or processing blocks may be performed in parallel. The specification and drawings are accordingly to be regarded in an illustrative rather than restrictive sense.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving a request from a user equipment device (UE) to attach to an access network based on a generic non-internet protocol (IP) access point name (APN);
   performing an initial service authorization of the UE for a non-IP data delivery (NIDD) service with the generic non-IP APN;
   generating a specific non-IP APN by combining the generic non-IP APN with an APN originating identifying anchor (OIA), wherein the APN OIA identifies an organization associated with the NIDD service;
   performing a secondary service authorization of the UE within the access network using the APN OIA; and
   notifying an application server (AS) of the UE availability for the NIDD service using the generic non-IP APN.

2. The method of claim 1, wherein performing the initial service authorization of the UE for the NIDD service further comprises:
   sending an update location request along with the generic non-IP APN to authenticate the UE; and
   receiving an update location answer that includes the APN OIA.

3. The method of claim 1, further comprising:
   receiving a reference APN OIA from a profile database; and
   validating the reference APN OIA received from the profile database.

4. The method of claim 3, wherein performing the secondary service authorization within the access network using the APN OIA further comprises:
   extracting a copy of the APN OIA from the specific non-IP APN; and
   determining a match between the extracted copy of the APN OIA and the reference APN OIA.

5. The method of claim 4, further comprising:
   sending a notification to a billing system for charging an account associated with the NIDD service, wherein the notification includes an organization identifier.

6. The method of claim 1, further comprising:
   correlating the UE with an account service associated with the NIDD service.

7. The method of claim 1, wherein receiving the request to attach to the access network further comprises:
receiving the request from the UE via a home network or a roaming network, wherein the UE is provisioned with the generic non-IP APN stored within a subscriber identity module (SIM).

8. A network device, comprising:
a network interface;
a memory configured to store instructions; and
a processor coupled to the network interface and the memory, wherein the processor is configured to execute the instructions stored in the memory to:
receive a request from a user equipment device (UE) to attach to an access network based on a generic non-internet protocol (IP) access point name (APN),
perform an initial service authorization of the UE for a non-IP data delivery (NIDD) service with the generic non-IP APN,
generate a specific non-IP APN by combining the generic non-IP APN with an APN originating identifying anchor (OIA), wherein the APN OIA identifies an organization associated with the NIDD service,
perform a secondary service authorization within the access network using the APN OIA, and
notify an application server (AS) of the UE availability for the NIDD service using the generic non-IP APN.

9. The network device of claim 8, wherein the instructions to perform the initial service authorization of the UE for the NIDD service further cause the processor to:
send an update location request along with the generic non-IP APN to authenticate the UE; and
receive an update location answer that includes the APN OIA.

10. The network device of claim 8, wherein the instructions further cause the processor to:
receive a reference APN OIA from a profile database; and
validate the reference APN OIA received from the profile database.

11. The network device of claim 10, wherein the instructions to perform the secondary service authorization within the access network using the APN OIA further cause the processor to:
extract a copy of the APN OIA from the specific non-IP APN; and
determine a match between the extracted copy of the APN OIA and the reference APN OIA.

12. The network device of claim 11, wherein the instructions further cause the processor to:
send a notification to a billing system for charging an account associated with the NIDD service, wherein the notification includes an organization identifier.

13. The network device of claim 8, the instructions further cause the processor to:
correlate the UE with the account service associated with the NIDD service.

14. The network device of claim 8, wherein the instructions to receive the request to attach to the access network further cause the at least one processor to:
receive the request from the UE via a home network or a roaming network, wherein the UE is provisioned with the generic non-IP APN stored within a subscriber identity module (SIM).

15. A non-transitory computer-readable medium comprising instructions, which, when executed by a processor, cause the processor to:
receive a request from a user equipment device (UE) to attach to an access network based on a generic non-internet protocol (IP) access point name (APN);
perform an initial service authorization of the UE for a non-IP data delivery (NIDD) service with the generic non-IP APN;
generate a specific non-IP APN by combining the generic non-IP APN with an APN originating identifying anchor (OIA), wherein the APN OIA identifies an organization associated with the NIDD service;
perform a secondary service authorization within the access network using the APN OIA; and
notify an application server (AS) of the UE availability for the NIDD service using the generic non-IP APN.

16. The non-transitory computer-readable medium of claim 15, wherein the instructions to perform the initial service authorization of the UE for the NIDD service further cause the processor to:
send an update location request along with the generic non-IP APN to authenticate the UE; and
receive an update location answer that includes the APN OIA.

17. The non-transitory computer-readable medium of claim 15, wherein the instructions further cause the processor to:
receive a reference APN OIA from a profile database; and
validate the reference APN OIA received from the profile database.

18. The non-transitory computer-readable medium of claim 17, wherein the instructions to perform the secondary service authorization within the access network using the APN OIA further cause the processor to:
extract a copy of the APN OIA from the specific non-IP APN; and
determine a match between the extracted copy of the APN OIA and the reference APN OIA.

19. The non-transitory computer-readable medium of claim 18, wherein the instructions to further cause the processor to:
send a notification to a billing system for charging an account associated with the NIDD service, wherein the notification includes an organization identifier.

20. The non-transitory computer-readable medium of claim 15, the instructions further cause the processor to:
correlate the UE with an account service associated with the NIDD service.

* * * * *